US009949143B2

(12) United States Patent
Nammi et al.

(10) Patent No.: US 9,949,143 B2
(45) Date of Patent: Apr. 17, 2018

(54) TRANSMISSION OF PROBING PILOTS IN A COMBINED RADIO CELL

(71) Applicant: TELEFONAKTIEBOLAGET L M ERICSSON (PUBL), Stockholm (SE)

(72) Inventors: Sairamesh Nammi, Kista (SE); Namir Lidian, Solna (SE); Mark Curran, County Carlow (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 176 days.

(21) Appl. No.: 14/739,757

(22) Filed: Jun. 15, 2015

(65) Prior Publication Data
US 2015/0365212 A1 Dec. 17, 2015

Related U.S. Application Data

(60) Provisional application No. 62/012,650, filed on Jun. 16, 2014.

(51) Int. Cl.
*H04W 16/32* (2009.01)
*H04W 52/02* (2009.01)
*H04L 5/00* (2006.01)
*H04W 88/12* (2009.01)

(52) U.S. Cl.
CPC ............ *H04W 16/32* (2013.01); *H04L 5/005* (2013.01); *H04L 5/006* (2013.01); *H04L 5/0032* (2013.01); *H04L 5/0091* (2013.01); *H04W 52/0216* (2013.01); *H04W 52/0229* (2013.01); *H04L 5/0023* (2013.01); *H04L 5/0057* (2013.01); *H04W 88/12* (2013.01); *Y02B 60/50* (2013.01)

(58) Field of Classification Search
CPC ......... H04W 52/0216; H04W 52/0229; H04W 16/32; H04L 5/0091; H04L 5/0032; H04L 5/005; H04L 5/006
See application file for complete search history.

(56) References Cited

U.S. PATENT DOCUMENTS

| 2008/0299984 A1* | 12/2008 | Shimomura | H04W 52/325 455/446 |
| 2010/0056171 A1* | 3/2010 | Ramprashad | H04W 16/10 455/452.1 |
| 2013/0102305 A1* | 4/2013 | Liu | H04W 24/02 455/422.1 |
| 2013/0195008 A1* | 8/2013 | Pelletier | H04B 7/0417 370/328 |
| 2016/0050001 A1* | 2/2016 | Kang | H04B 7/0617 370/329 |

OTHER PUBLICATIONS

Ericsson, etal., "R1-132603: Overview of Spatial Reuse Mode in Combined Cell Deployment for Heterogeneous Networks," 3rd Generation Partnership Project (3GPP), TSG RAN WG1 Meeting #73, May 20-24, 2013, 7 pages, Fukuoka, Japan.*

* cited by examiner

*Primary Examiner* — Charles C Jiang
*Assistant Examiner* — Kyaw Z Soe

(57) ABSTRACT

The present disclosure relates to radio communication and, more particularly, utilization of probing pilots (e.g. F-CPICHs) in a combined radio cell deployment. In one of its aspects, the disclosure presents an adaptive utilization of probing pilots in a combined radio cell deployment.

27 Claims, 7 Drawing Sheets

Abbreviations:

CPICH: Common Pilot Channel
F-CPICH: Fractional CPICH
P-CPICH: Primary CPICH
HS-DPCCH: High Speed-Dedicated Physical Control Channel
D-CPICH: Demodulation CPICH
HS-SCCH: High Speed-Shared Control Channel
HS-PDSCH: High Speed-Physical Downlink Shared Channel

TRANSMISSION OF PROBING PILOTS IN A COMBINED RADIO CELL

TECHNICAL FIELD

Embodiments of the technology presented herein generally relate to radio communication. More particularly, some of the embodiments presented herein relate to a method and a system in a radio communication network of a combined radio cell environment. Corresponding methods and network elements (or, nodes) in a radio communication network of a combined radio cell environment are also described.

BACKGROUND

This section is intended to provide a background to the various embodiments of the technology that are described in this disclosure. Therefore, unless otherwise indicated herein, what is described in this section should not be interpreted to be prior art by its mere inclusion in this section.

Radio communication networks are widely deployed to provide various communication services such as telephony, video, data, messaging, broadcasts, and so on. Such radio communication networks support communications for multiple user equipments (UEs) by sharing the available network resources. One example of such a network is the Universal Mobile Telecommunications System (UMTS), a third generation (3G) technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on W-CDMA has been deployed in many places of the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). More detailed descriptions of radio communication networks and systems can be found in literature, such as in Technical Specifications published by, e.g., the 3GPP.

Classical Versus Shared Radio Cell Deployments

In the following, the term point is used to mean a point having transmission and/or reception capabilities. As used herein, this term may interchangeably be referred to as "transmission point", "reception point", "transmission/reception point" or "node". To this end, it should also be appreciated that the term point may include devices such as radio network nodes (e.g. evolved NodeB (eNB), a Radio Network Controller (RNC), etc)) and radio units (e.g. Remote Radio Units (RRUs)). As is known among persons skilled in the art, radio network nodes generally differ from RRUs in that the radio network nodes have comparatively more controlling functionality. For example, radio network nodes typically include scheduler functionality, etc., whereas RRUs typically don't. Therefore, RRUs are typically consuming comparatively less computational power than radio network nodes. Sometimes, radio network nodes may therefore be referred to as high power points or high power nodes (HPN) whereas RRUs may be referred to as low power points or low power nodes (LPN). In some cell deployments, LPNs are referred to as pico points and HPNs are referred to as macro points. Thus, macro points are points having comparatively higher power than the pico points.

The classical way of deploying a network is to let different transmission/reception points form separate cells. That is, the signals transmitted from or received at a point is associated with a cell-id (e.g. a Physical Cell Identity (PCI)) that is different from the cell-id employed for other nearby points. Conventionally, each point transmits its own unique signals for broadcast (e.g., PBCH (Physical Broadcast Channel)) and sync channels (e.g., PSS (primary synchronization signal), SSS (secondary synchronization signal)). The classical way of utilizing one cell-id per point is depicted in FIG. 1 for a heterogeneous deployment where a number of LPNs are placed within the coverage area of a HPN. Note that similar principles also apply to classical macro-cellular deployments where all points have similar output power and perhaps are placed in a more regular fashion compared with the case of a heterogeneous deployment.

A recent alternative to the classical cell deployment is to let all the UEs within the geographical area outlined by the coverage of the HPN be served with signals associated with the same cell-id (e.g. the same Physical Cell Identity (PCI)). In other words, from a UE perspective, the received signals appear coming from a single cell. This is schematically illustrated in FIG. 2. Note that only one HPN is shown, other HPNs would typically use different cell-ids (corresponding to different cells) unless they are co-located at the same site. In the latter case of several co-located HPNs, the same cell-id may be shared across the co-located HPNs and those LPNs that correspond to the union of the coverage areas of the macro points. Sync channels, BCH (Broadcast Channels) and control channels may all be transmitted from the HPN while data can be transmitted to a UE also from LPNs by using shared data transmissions (e.g. a Physical Downlink Shared Channel (PDSCH)) relying on UE specific resources. In FIG. 2, the HPN may e.g. be radio network node such as a eNB. The LPNs may be radio units such as those commonly referred to as Remote Radio Units (RRUs).

The single cell-id approach, or combined radio cell deployment (aka shared radio cell deployment or soft radio cell deployment) can be geared towards situations in which there is fast backhaul communication between the points associated to the same cell. A typical case would be a radio network node serving one or more sectors on a macro level as well as having fast fiber connections to remote radio units (RRUs) playing the role of the other points sharing the same cell-id. Those RRUs could represent LPNs with one or more antennas each. Another example is when all the points have a similar power class with no single point having more significance than the others. The radio network node would then handle the signals from all RRUs in a similar manner.

An advantage of the combined cell approach compared with the classical approach is that the typically involved handover procedure between cells only needs to be invoked on a macro basis. Generally, there is also greater flexibility in coordination and scheduling among the points.

Transmission Modes in Combined Cell Deployment

There exist different transmission modes in a combined radio cell deployment. The different transmission modes can e.g. be divided into:

Single Frequency Network (SFN):

In this mode, all nodes generally transmit the same pilot channel. Also, data and control information are transmitted from all nodes. In this mode, only one UE can be served from all the nodes at any time. Hence, this mode can be said to be useful for coverage improvements. Furthermore, this mode works for legacy UEs. As used in this disclosure the expression "legacy UE" is used to mean a UE that supports 3GPP Rel-5, Rel-6, Rel-7, Rel-8, Rel-9, Rel-10, and/or Rel-11. That is, the expression "legacy UE" refers to pre-release 12 UEs.

Node Selection with Spatial Re-Use:

In this mode, even though all nodes transmit the same pilot channel, data and control information transmitted from one node may be different from the data and control information transmitted from other nodes. For example, a node may be serving a specific UE, while at the same time different data and control information may be sent to a different UE. Hence, the spatial resources can be reused. This mode thus allows for load balancing gains and, accordingly, the capacity of the combined radio cell can be increased.

In a combined radio cell deployment it is generally a radio network node (sometimes referred to as "the radio network scheduler element" or "the central controller") that takes responsibility for collecting operational information, operational data or operational statistics from various measurements that are made throughout the combined radio cell. Typically, but not necessarily, the decision of which LPN node (e.g. RRU) that should transmit to a specific UE is made by this radio network node based on the collected operational information, operational data or operational statistics. The operational information, operational data or operational statistics may be collected (e.g. obtained, acquired, or received) from the various LPNs. Additionally, or alternatively, this operational information, operational data or operational statistics may be collected from the UEs that are present in the combined radio cell.

Pilots for Supporting Spatial Reuse Mode in a Combined Radio Cell

In a combined radio cell deployment it may be beneficial or useful to utilize additional pilots, i.e. pilots in addition to normal or regular pilots. As used herein "normal" or "regular" pilots refer to pilots such as common pilots. On the other hand, probing pilots (which will be further explained herein) is an example of an additional pilot within the context of this disclosure.

Additional pilots, such as the above-mentioned probing pilots, may be advantageous in a combined radio cell deployment for various reasons, for example:

Identifying which Node is the Best Available (or Best Suitable) Node for a Particular UE:

In a combined radio cell deployment, all the nodes transmit the same common pilot (C-PICH) and the UE computes, or otherwise determines, a channel quality indicator (CQI) on the basis of the received common pilots. Hence, the central node does not know where the UE is located or which nodes should transmit data to a particular UE. This may be seen as a similarity with cell selection in co-channel deployment, where the UE compares the pilot strengths of each node and decide which radio cell sector is the best available, or most suitable, for the UE in question. In a combined radio cell deployment, since all nodes have the same primary scrambling code, the UE cannot generally distinguish between individual pilots.

Data Demodulation:

In a combined radio cell deployment, a UE is receiving pilots (or pilots signals) from all the nodes for CQI for channel sounding (e.g., CQI computation), while data is transmitted from only one or a subset of nodes. Hence, the channel estimation for data demodulation may become erroneous if the UE would use channel estimation from combined P-CPICHs. In order to estimate the channel in a better way, it may be advantageous to utilize additional pilots, e.g. probing pilots.

Pilot Design Options

The 3GPP is studying various pilot design options. Two example pilot design options are described in R1-132603, "Overview of Spatial Reuse Mode in Combined Cell Deployment for Heterogeneous Networks", which was presented at the 3GPP RAN1#73 meeting in Fukuoka, Japan, 20-24 May 2013. In brief, the first option (i.e. Option 1) introduces additional pilots in the form of probing pilots which can be transmitted continuously at a relatively low power level, whereas the other option (i.e. Option 2) uses demodulation pilots as probing pilots with a comparatively higher power. The first design option (i.e. Option 1) of R1-132603 will now be briefly described:

Separate Probing and Demodulation Pilots:

FIG. 3 illustrates a signaling diagram of example messages when utilizing separate probing and demodulation pilots. Assume that a combined radio cell deployment comprises four nodes (or transmission points) serving multiple UEs. It should be appreciated that the same procedure is applicable also in scenarios where the number of nodes is less than or more than four. A reference signal which is unique to each node in a combined cell called Fractional CPICH (F-CPICH) is transmitted from each node simultaneously and continuously. The F-CPICH is generally characterized by a spreading code (typically SF=256 (SF is an abbreviation for Spreading Factor)) and a scrambling code which is either the primary scrambling code or a secondary scrambling code of the combined radio cell. The F-CPICH channel power levels may be indicated to the UE during the initial cell set up. In addition to F-CPICH, the primary common pilot (P-CPICH) which is common to all the nodes is continuously transmitted. From these two different pilot signals, the UE can estimate the channel and feed back the channel quality information (CQI) associated with these two pilots e.g. at two time intervals. Note that the CQI estimated with F-CPICH indicates the channel quality corresponding to the specific node, referred to hereafter as $CQI_F$, and the CQI computed using P-CPICH is the channel quality using the combined nodes, referred to hereafter as $CQI_P$. These two CQIs are typically, but not necessarily, time multiplexed and sent on the uplink feedback channel HS-DPCCH. The same HS-DPCCH signal is received by all the nodes. The radio network scheduler element (e.g., a radio network node such as a RNC or eNB) can process the received signal (HS-DPCCH) from all the nodes. From $CQI_F$ the radio network scheduler element identifies which node the UE is close to. Hence the radio network scheduler element can inform a node in question to transmit to the UE. The assigned node transmits the demodulation pilot channel (D-CPICH), downlink control channel (HS-SCCH) and the downlink traffic channel (HS-PDSCH) to the respective UE.

Similarly, the radio network scheduler element informs the other nodes to transmit to the other UEs. Note that D-CPICH and F-CPICH use different spreading codes and may have different power levels. For example, the power level of F-CPICH may be relatively low and D-CPICH may be relatively high.

SUMMARY

It is in view of the above considerations and others that the various embodiments disclosed herein have been made. The introduction of probing pilots in combined radio cell deployments may cause new challenges that didn't exist before the introduction of these probing pilots. For example, in some mass cell deployment scenarios (using, for example, 30 LPNs, or more), the radio network scheduler element cannot generally schedule a certain UE until it receives, or otherwise obtains or acquires, the channel quality information from all 30 LPNs. Hence there could be a delay associated with the selection of the best node when the number of LPNs is large. In turn, this could imply that the average link throughput is reduced. In addition, the UE battery consumption could increase when the UE needs to estimate the channel quality information from all nodes.

Therefore, it is a general aim to provide alternative methods, systems and devices (e.g. network elements or nodes) that alleviate, obviate, or eliminate one or more of the above-listed potential challenges.

In one of its aspects, the technology disclosed herein concerns a method performed in a radio communication network of a combined radio cell environment. The radio communication network comprises a radio network control element controlling a radio network scheduler element, which radio network scheduler element is serving a radio cell sector of a combined radio cell. The method comprises the following steps, or actions:

the radio network control element assigns a set of probing pilots to the combined radio cell;
the radio network control element transmits a first signal to a user equipment via a radio network scheduler element, the first signal comprising information about the assigned set of probing pilots;
the radio network scheduler element receives a second signal from the user equipment, the second signal comprising channel quality feedback information related to each one of the probing pilots in the assigned set of probing pilots;
the radio network scheduler element ranks, based on the received channel quality feedback information, the probing pilots of the set of probing pilots;
the radio network scheduler element selects, based on the ranking of the probing pilots of said set of probing pilots, a subset of probing pilots from the assigned set of probing pilots;
the radio network scheduler element transmits a third signal to the radio network control element, the third signal comprising information about the probing pilots of the subset of probing pilots;
the radio network control element receives the third signal from the radio network scheduler element;
the radio network control element transmits a fourth signal to the user equipment via the radio network scheduler element, the fourth signal comprising information about the probing pilots of the subset of probing pilots such that the user equipment can be subsequently reconfigured for probing by the radio network scheduler element utilizing only the probing pilots of the subset of probing pilots; and
the radio network scheduler element transmitting, to the user equipment, only the probing pilots of the subset of probing pilots for subsequent probing.

In some embodiments, the radio network control element transmits said first signal comprising information about the assigned set of probing pilots only once (e.g. only once during a certain pre-defined time period).

The channel quality feedback information related to each one of the probing pilots in the assigned set of probing pilots may comprise Channel Quality Indicators (CQIs) related to each one the probing pilots in the assigned set of probing pilots. Alternatively, the channel quality feedback information related to each one of the probing pilots in the assigned set of probing pilots may comprise information from downlink measurements related to each one the probing pilots in the assigned set of probing pilots. For example, the downlink measurements may include path losses.

In some embodiments, the radio network control element and the radio network scheduler element are separate elements. For example, the radio network control element may be a Radio Network Controller (RNC) and the radio network scheduler element may be a NodeB. In alternative embodiments, the radio network control element and the radio network scheduler element are comprised in a single element. For instance, the single element may be implemented as an evolved NodeB (eNodeB).

In another of its aspects, the technology disclosed herein concerns a method performed by a radio network control element in a radio communication network of a combined radio cell environment. The radio communication network comprises the radio network control element controlling a radio network scheduler element, wherein the radio network scheduler element is serving a radio cell sector of a combined radio cell. The method comprising the following steps, or actions:

assigning a set of probing pilots to the combined radio cell;
transmitting a first signal to a user equipment via a radio network scheduler element, the first signal comprising information about the assigned set of probing pilots;
receiving a third signal from the radio network scheduler element, the third signal comprising information about probing pilots of a subset of probing pilots; and
transmitting a fourth signal to said user equipment via the radio network scheduler element, the fourth signal comprising information about the probing pilots of the subset of probing pilots such that the user equipment can be subsequently reconfigured for probing by the radio network scheduler element utilizing only the probing pilots of the subset of probing pilots.

In some embodiments, the method comprises transmitting said first signal comprising information about the assigned set of probing pilots only once.

Advantageously, the radio network control element may be a Radio Network Controller (RNC).

In still another of its aspects, the technology disclosed herein concerns a method performed by a radio network scheduler element in a radio communication network of a combined radio cell environment. The radio communication network comprises a radio network control element controlling the radio network scheduler element, wherein the radio network scheduler element is serving a radio cell sector of a combined radio cell. The method comprises the following steps, or actions:

receiving a second signal from a user equipment, the second signal comprising channel quality feedback information related to each one of the probing pilots in an assigned set of probing pilots;

ranking, based on the received channel quality feedback information, the probing pilots of said set of probing pilots;

selecting, based on the ranking of the probing pilots of said set of probing pilots, a subset of probing pilots from the assigned set of probing pilots;

transmitting a third signal to the radio network control element, the third signal comprising information about the probing pilots of the subset of probing pilots; and transmitting, to said user equipment, only the probing pilots of the subset of probing pilots for subsequent probing.

The channel quality feedback information related to each one of the probing pilots in the assigned set of probing pilots may advantageously comprise Channel Quality Indicators (CQIs) related to each one the probing pilots in the assigned set of probing pilots. Alternatively, the channel quality feedback information related to each one of the probing pilots in the assigned set of probing pilots may comprise information from downlink measurements related to each one the probing pilots in the assigned set of probing pilots. The downlink measurements may, e.g., include path losses.

Advantageously, the radio network scheduler element may be a NodeB.

In yet another of its aspects, the technology disclosed herein concerns a method performed by a radio network node in a radio communication network of a combined radio cell environment. The radio network node is serving a radio cell sector of a combined radio cell. The method comprises the following steps, or actions:

assigning a set of probing pilots to the combined radio cell;

transmitting a first signal to a user equipment, the first signal comprising information about the assigned set of probing pilots;

receiving a second signal from said user equipment, the second signal comprising channel quality feedback information related to each one the probing pilots in the assigned set of probing pilots;

ranking, based on the received channel quality feedback information, the probing pilots of said set of probing pilots;

selecting, based on the ranking of the probing pilots of said set of probing pilots, a subset of probing pilots from the assigned set of probing pilots;

transmitting a fourth signal to said user equipment, the fourth signal comprising information about the probing pilots of the subset of probing pilots such that the user equipment can be subsequently reconfigured for probing by the radio network scheduler element utilizing only the probing pilots of the subset of probing pilots; and transmitting, to said user equipment, only the probing pilots of the subset of probing pilots for subsequent probing.

In some embodiments, the method comprises transmitting said first signal comprising information about the assigned set of probing pilots only once.

The channel quality feedback information related to each one of the probing pilots in the assigned set of probing pilots may, e.g., comprise Channel Quality Indicators (CQIs) related to each one the probing pilots in the assigned set of probing pilots. Alternatively, the channel quality feedback information related to each one of the probing pilots in the assigned set of probing pilots may comprise information from downlink measurements related to each one the probing pilots in the assigned set of probing pilots. For example, the downlink measurements may include path losses.

Advantageously, the radio network node may be an evolved NodeB (eNodeB).

According to still another of its aspects, the technology disclosed herein concerns a system in a radio communication network of a combined radio cell environment. The system comprises a radio network control element configured to control a radio network scheduler element. The radio network scheduler element is configured to serve a radio cell sector of a combined radio cell. Furthermore, the radio network control element is configured to assign a set of probing pilots to the combined radio cell. The radio network control element is also configured to transmit a first signal to a user equipment via a radio network scheduler element, the first signal comprising information about the assigned set of probing pilots. The radio network scheduler element is configured to receive a second signal from said user equipment, the second signal comprising channel quality feedback information related to each one of the probing pilots in the assigned set of probing pilots. Moreover, the radio network scheduler element is configured to rank, based on the received channel quality feedback information, the probing pilots of said set of probing pilots. The radio network scheduler element is also configured to select, based on the ranking of the probing pilots of said set of probing pilots, a subset of probing pilots from the assigned set of probing pilots. Still further, the radio network scheduler element is configured to transmit a third signal to the radio network control element, the third signal comprising information about the probing pilots of the subset of probing pilots. The radio network control element is configured to receive the third signal from the radio network scheduler element. Also, the radio network control element is configured to transmit a fourth signal to said user equipment via the radio network scheduler element, the fourth signal comprising information about the probing pilots of the subset of probing pilots such that the user equipment can be subsequently reconfigured for probing by the radio network scheduler element utilizing only the probing pilots of the subset of probing pilots. Still further, the radio network scheduler element is configured to transmit, to said user equipment, only the probing pilots of the subset of probing pilots for subsequent probing.

For example, the radio network control element may be configured to transmit said first signal comprising information about the assigned set of probing pilots only once.

The channel quality feedback information related to each one of the probing pilots in the assigned set of probing pilots may comprise Channel Quality Indicators (CQIs) related to each one the probing pilots in the assigned set of probing pilots. Alternatively, the channel quality feedback information related to each one of the probing pilots in the assigned set of probing pilots may comprise information from downlink measurements related to each one the probing pilots in the assigned set of probing pilots. The downlink measurements may, e.g., include path losses.

In some embodiments, the radio network control element and the radio network scheduler element are separate elements. For example, the radio network control element may be a Radio Network Controller (RNC) and the radio network scheduler element may be a NodeB.

In other embodiments, the radio network control element and the radio network scheduler element are comprised in a single element. The single element may e.g. be an evolved NodeB (eNodeB).

According to still another of its aspects, the technology disclosed herein concerns a radio network control element in a radio communication network of a combined radio cell environment. The radio network control element is configured to control a radio network scheduler element, which radio network scheduler element is configured to serve a radio cell sector of a combined radio cell. The radio network control element comprises: means adapted to assign a set of probing pilots to the combined radio cell; means adapted to transmit a first signal to a user equipment via a radio network scheduler element, the first signal comprising information about the assigned set of probing pilots; means adapted to receive a third signal from the radio network scheduler element, the third signal comprising information about probing pilots of a subset of probing pilots; and means adapted to transmit a fourth signal to said user equipment via the radio network scheduler element, the fourth signal comprising information about the probing pilots of the subset of probing pilots such that the user equipment can be subsequently reconfigured for probing by the radio network scheduler element utilizing only the probing pilots of the subset of probing pilots.

The means adapted to transmit the first signal may be adapted to transmit said first signal comprising information about the assigned set of probing pilots only once.

For example, the radio network control element may be a Radio Network Controller (RNC).

According to still another of its aspects, the technology disclosed herein concerns a radio network scheduler element in a radio communication network of a combined radio cell environment. The radio communication network comprises a radio network control element which is configured to control the radio network scheduler element, wherein the radio network scheduler element is configured to serve a radio cell sector of a combined radio cell. The radio network scheduler element comprises: means adapted to receive a second signal from a user equipment, the second signal comprising channel quality feedback information related to each one of the probing pilots in an assigned set of probing pilots; means adapted to rank, based on the received channel quality feedback information, the probing pilots of said set of probing pilots; means adapted to select, based on the ranking of the probing pilots of said set of probing pilots, a subset of probing pilots from the assigned set of probing pilots; means adapted to transmit a third signal to the radio network control element, the third signal comprising information about the probing pilots of the subset of probing pilots; and means adapted to transmit, to said user equipment, only the probing pilots of the subset of probing pilots for subsequent probing.

The channel quality feedback information related to each one of the probing pilots in the assigned set of probing pilots may e.g. comprise Channel Quality Indicators (CQIs) related to each one the probing pilots in the assigned set of probing pilots. Alternatively, the channel quality feedback information related to each one of the probing pilots in the assigned set of probing pilots comprises information from downlink measurements related to each one the probing pilots in the assigned set of probing pilots. The downlink measurements may include path losses.

For example, the radio network scheduler element may be a NodeB.

According to still a further of its aspects, the technology disclosed herein concerns a radio network node in a radio communication network of a combined radio cell environment. The radio network node may be configured to serve a radio cell sector of a combined radio cell. The radio network node comprises: means adapted to assign a set of probing pilots to the combined radio cell; means adapted to transmit a first signal to a user equipment, the first signal comprising information about the assigned set of probing pilots; means adapted to receive a second signal from said user equipment, the second signal comprising channel quality feedback information related to each one the probing pilots in the assigned set of probing pilots; means adapted to rank, based on the received channel quality feedback information, the probing pilots of said set of probing pilots; means adapted to select, based on the ranking of the probing pilots of said set of probing pilots, a subset of probing pilots from the assigned set of probing pilots; means adapted to transmit a fourth signal to said user equipment, the fourth signal comprising information about the probing pilots of the subset of probing pilots such that the user equipment can be subsequently reconfigured for probing by the radio network scheduler element utilizing only the probing pilots of the subset of probing pilots; and means adapted to transmit, to said user equipment, only the probing pilots of the subset of probing pilots for subsequent probing.

The means adapted to transmit said first signal may be adapted to transmit said first signal comprising information about the assigned set of probing pilots only once.

The channel quality feedback information related to each one of the probing pilots in the assigned set of probing pilots may e.g. comprise Channel Quality Indicators (CQIs) related to each one the probing pilots in the assigned set of probing pilots. Additionally, or alternatively, the channel quality feedback information related to each one of the probing pilots in the assigned set of probing pilots may comprise information from downlink measurements related to each one the probing pilots in the assigned set of probing pilots. The downlink measurements may, for instance, include path losses.

For instance, the radio network node may be an evolved NodeB (eNodeB).

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The technology will now be described more fully hereinafter with reference to the accompanying drawings, in which certain embodiments are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

As used in this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC devices, which do not necessarily involve human interaction. In this regard, it should also be appreciated that the term "user equipment (UE)" as used herein may apply the definition as specified on page 33 of 3GPP TR 21.905 V.12.0.0 (2013-06).

In one of its aspects, the technology presented herein concerns adaptive utilization of probing pilots in a combined radio cell deployment.

Figure 1:
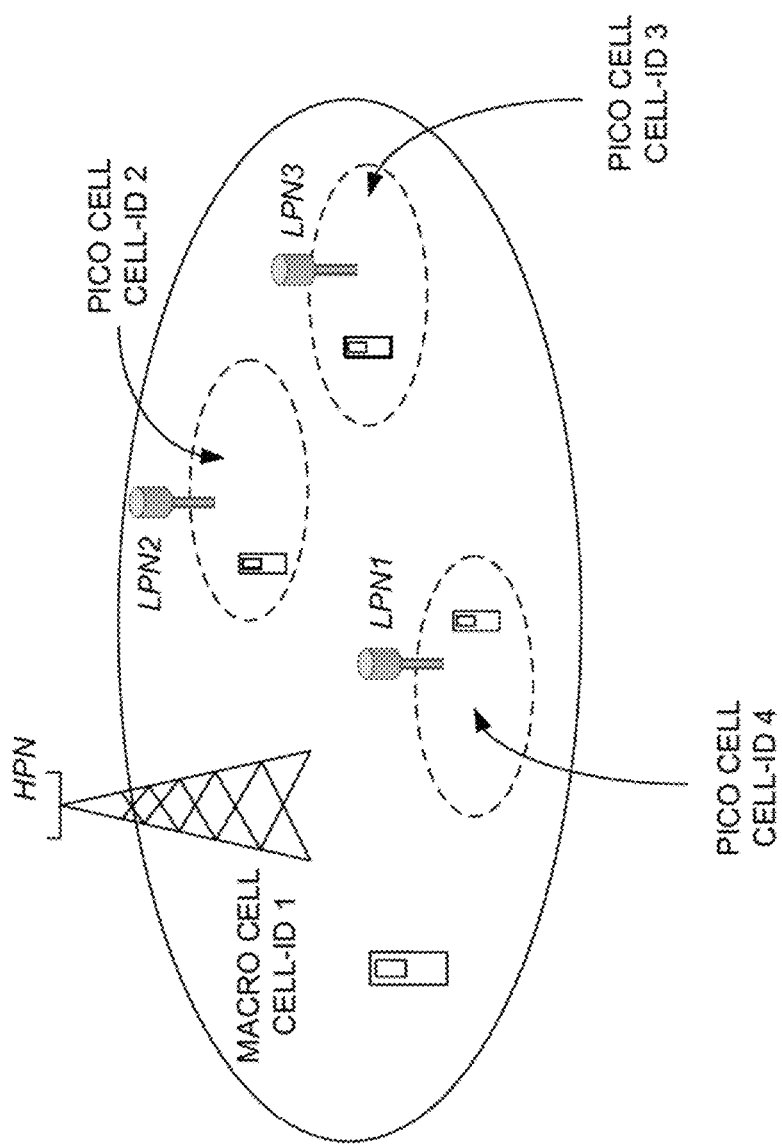
FIG. 1 shows an example of a heterogeneous radio network utilizing a classical cell deployment.
Figure 2:
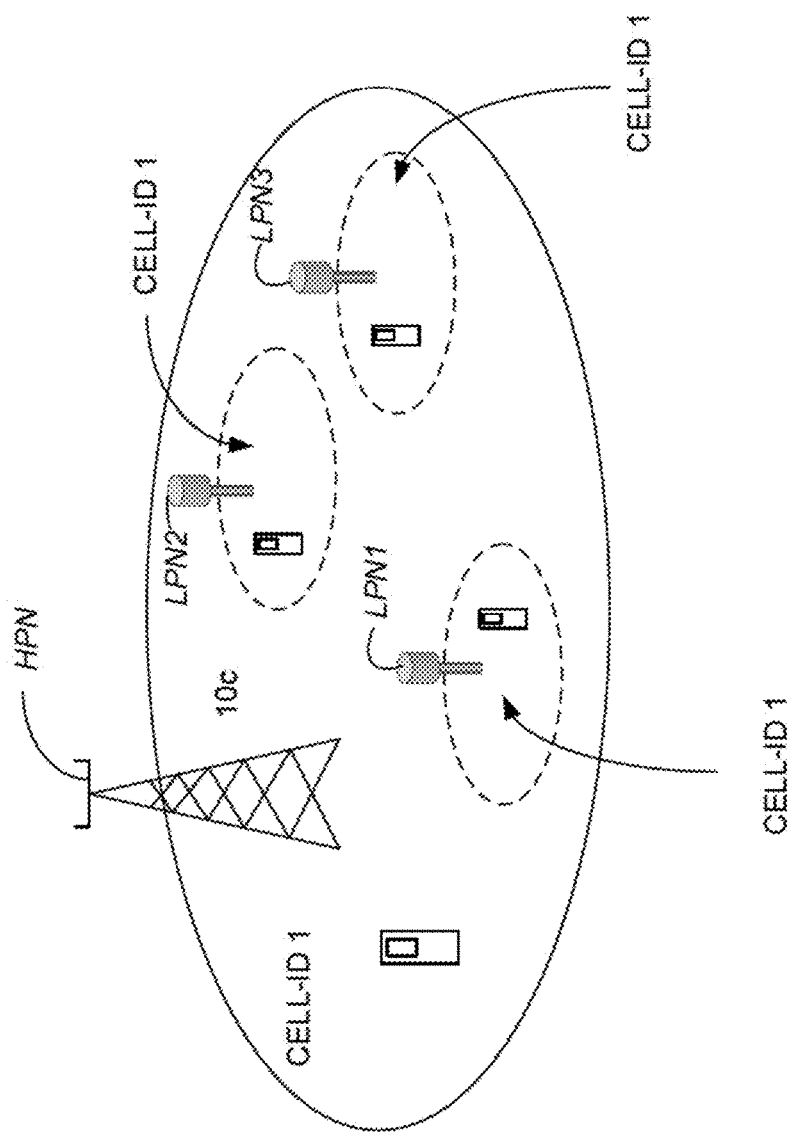
FIG. 2 shows an example of a heterogeneous radio network utilizing a combined cell deployment.
Figure 4A:
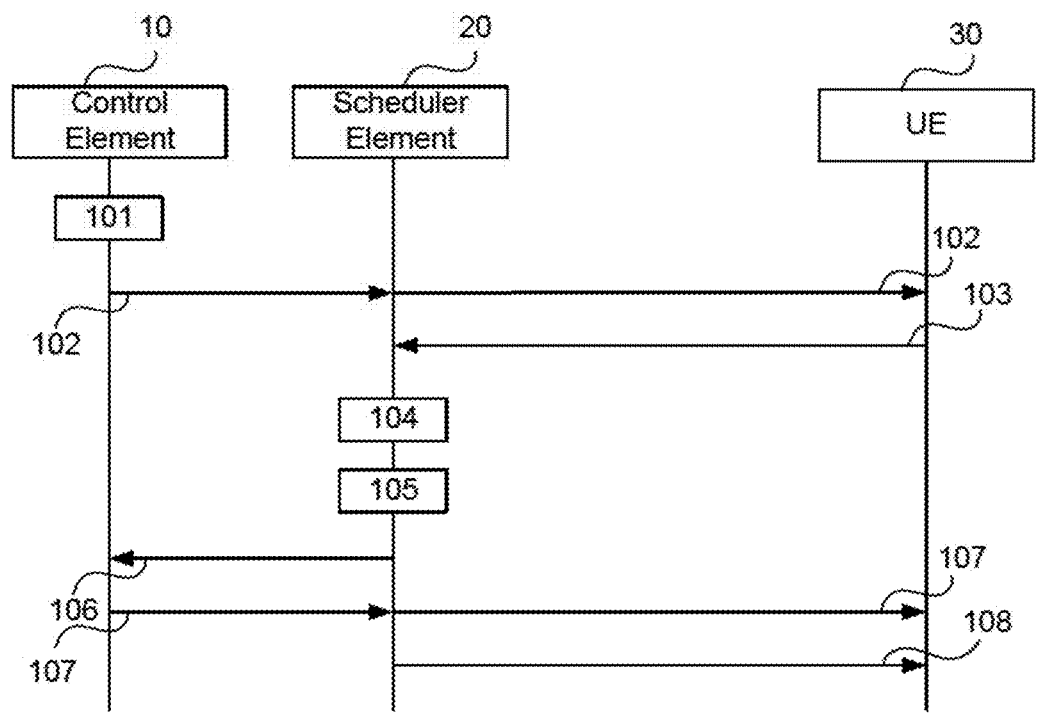
FIGS. 4A-4C are signaling diagrams showing messages between radio network elements, or nodes, according to various embodiments.

FIG. 4A shows a signaling diagram illustrating a sequence of messages between a radio network control element 10, a radio network scheduler element 20 and a UE 30 in accordance with a first embodiment. The radio network control element 10, the radio network scheduler element 20 and the UE 30 may be part of a heterogeneous radio communication network of a combined radio cell environment, such as the combined radio cell environment depicted in FIG. 2.

Figure 4B:
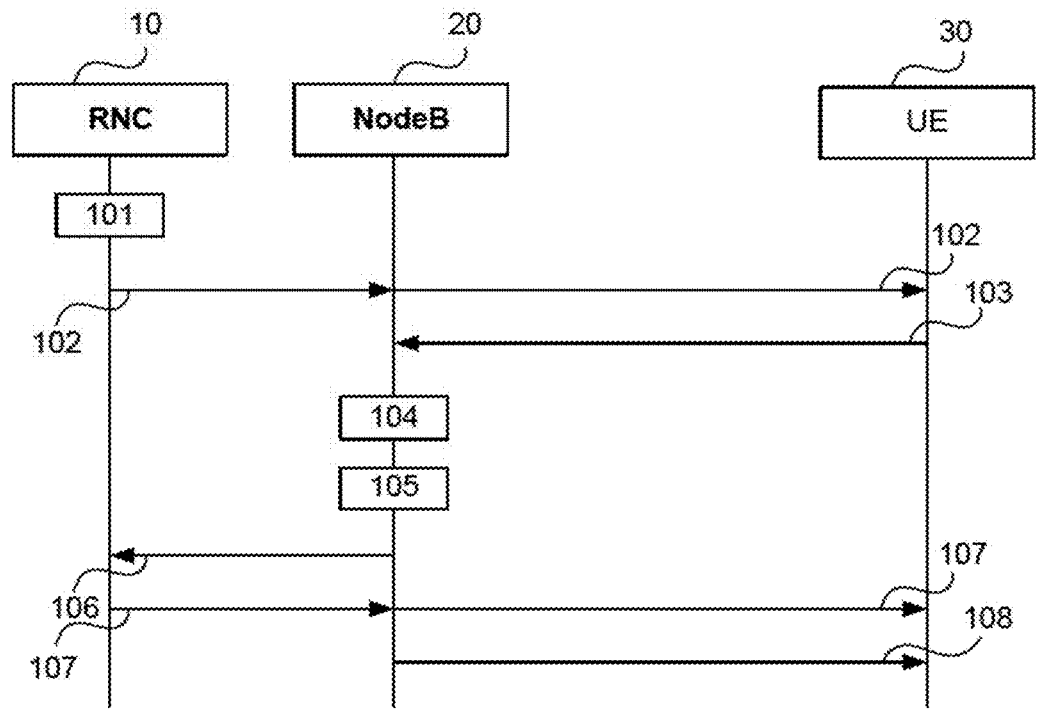
Figure 4C:
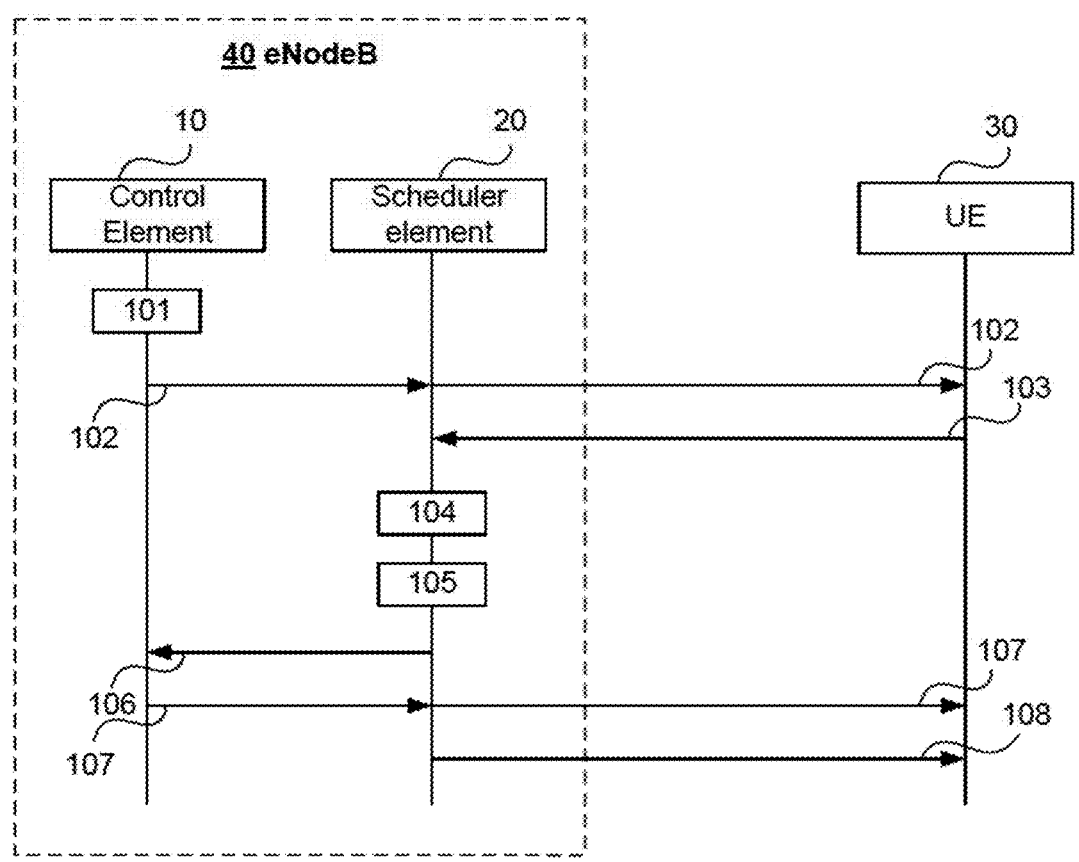

In one example implementation, which is applicable to UMTS and which is depicted in FIG. 4B, a distributed solution is suggested. As can be seen in FIG. 4B, the radio network control element 10 and the radio network scheduler element 20 may be implemented as separate network elements. For example, the radio network control element 10 may be implemented in a RNC and the radio network scheduler element 20 may be implemented in a NodeB. In another example implementation, which is applicable to LTE and which is depicted in FIG. 4C, the radio network control element 10 and the radio network scheduler element 20 may be implemented in a single network element, such as in an eNodeB.

Action 101

The radio network control element 10 assigns a set of probing pilots (e.g., F-CPICHs) to the combined radio cell.

Action 102

The radio network control element 10 transmits a first signal to the UE 30 via the radio network scheduler element 20. The first signal comprises information about the assigned set of probing pilots. In some embodiments, the radio network control element 10 transmits this first signal only once (e.g. only once during a certain pre-defined time period).

The first signal may e.g. comprise information about the assigned set of probing pilots such as: the number (N) of assigned probing pilots, channelization codes of the N assigned probing pilots, power offsets and/or exact powers of the N assigned probing pilots. Additionally, the first signal may e.g. comprise information about the indexes of the N assigned probing pilots (e.g. Pilot #1, Pilot #2, . . . , Pilot #N).

At least one UE 30 receives the first signal, which first signal comprises the above-mentioned information about the assigned set of probing pilots.

Once the UE 30 receives the first signal, this UE 30 can estimate the channel quality from each probing pilot (i.e. Pilot #1, Pilot #2, . . . , Pilot #N) e.g. in order to compute, or otherwise determine, channel quality feedback information. In one embodiment, the UE computes, or otherwise determines, a Channel Quality Indicator (CQI). Each CQI may be multiplexed and fed back (in a second signal) to the radio network scheduler element 20. In another embodiment, the UE determines the channel quality from downlink measurements such as path losses. This latter channel quality may also be fed back (in the second signal) to the radio network scheduler element 20.

Action 103

The radio network scheduler element 20 receives the second signal from said UE. The second signal comprises channel quality feedback information related to each one the probing pilots in the assigned set of probing pilots.

The channel quality feedback information related to each one of the probing pilots in the assigned set of probing pilots may comprise Channel Quality Indicators (CQIs) related to each one of the probing pilots in the assigned set of probing pilots. Alternatively, or additionally, the channel quality feedback information related to each one of the probing pilots in the assigned set of probing pilots may comprise information from downlink measurements related to each one the probing pilots in the assigned set of probing pilots. The downlink measurements may e.g. include path losses.

Action 104

The radio network scheduler element 20 ranks, based on the received channel quality feedback information, the probing pilots of said set of probing pilots.

The ranking may be made in descending order from the best probing pilots to the worst probing pilots. Alternatively, the ranking may be made in ascending order from the worst probing pilots to the best probing pilots.

In one example implementation, the received channel quality feedback information is CQI (as mentioned above). The CQI may be seen as a quantized version of a signal-to-noise ratio in binary format. For example, the UE may report (to the radio network scheduler element 20) the CQI based on one or more of the tables 7A to 7G in the 3GPP Technical Specification 25.214, V.11.8.0. Assume for example that the $CQI_1$ for a first probing pilot (i.e. Pilot #1) is 15, that the $CQI_2$ for a second probing pilot (i.e. Pilot #2) is 5 and that the $CQI_3$ for a third probing pilot (i.e. Pilot #3) is 10, see Table 1.

TABLE 1

CQI values associated with respective probing pilots.

| Pilot | CQI |
|---|---|
| #1 | 15 |
| #2 | 5 |
| #3 | 10 |

Based on the CQI values, the probing pilots of Table 1 may e.g. be ranked in descending order from the best probing pilots to the worst probing pilots, see Table 2.

TABLE 2

Example ranking of probing pilots based on received CQI values.

| Rank | Pilot | CQI |
|---|---|---|
| 1 | #1 | 15 |
| 2 | #3 | 10 |
| 3 | #2 | 5 |

Action 105

The radio network scheduler element 20 selects, based on the ranking of the probing pilots of said set of probing pilots, a subset (M) of probing pilots from the assigned set of probing pilots. The radio network scheduler element 20 thus selects a subset of M probing pilots from the larger set of N probing pilots, i.e. M<N. Typically, but not necessarily, the radio network scheduler element 20 selects the best M probing pilots from the larger set of N probing pilots.

Turning back to the example given above, assume that the radio network scheduler 20 selects the two best ranked probing pilots from the larger set of three probing pilots. According to this example, the radio network scheduler 20 would select probing pilots #1 and #3 since these two probing pilots are the two highest ranked probing pilots.

Action 106

The radio network scheduler element 20 transmits a third signal to the radio network control element 10. The third signal comprises information about the probing pilots of the subset of probing pilots.

The radio network control element 10 thus also receives the third signal from the radio network scheduler element 20.

Action 107

The radio network control element 10 transmits a fourth signal to said UE 30 via the radio network scheduler element 20. The fourth signal comprises information about the probing pilots of the subset (M) of probing pilots such that the UE 30 can be subsequently reconfigured for probing by the radio network scheduler element 20 utilizing only the probing pilots of the subset of probing pilots.

Action 108

The radio network scheduler element 20 transmits, to said UE 30 (and other UEs), only the probing pilots of the subset of probing pilots for subsequent probing.

Figure 3:
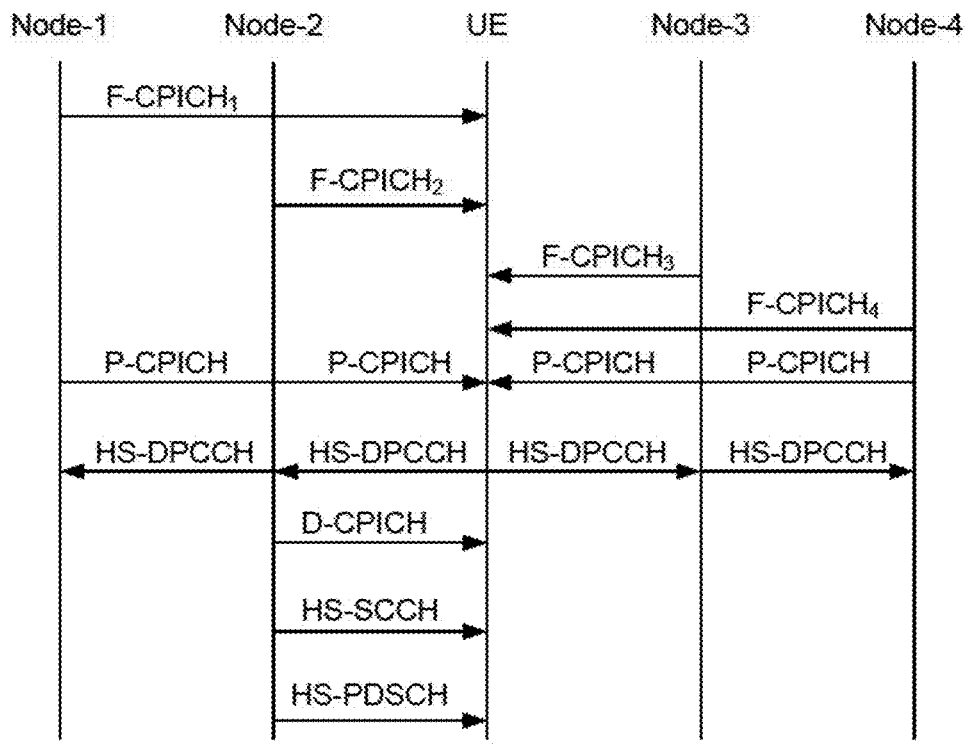
FIG. 3 is a message sequence chart showing messages between nodes and a UE using F-CPICH.

The subsequent probing may be in accordance with a signaling according to FIG. 3.

By transmitting only prioritized (i.e. higher ranked, or best ranked) probing pilots instead of all probing pilots resources can be saved for the subsequent probing. This may be particularly advantageous in some mass cell deployment scenarios where there exists a large number of LPNs.

In addition to the example implementations described with reference to FIGS. 4A-4C, the inventors also propose the following example methods:

Method I: Using Two Stage Procedure

Step 1:

In Method I, the inventors propose that a set of probing pilots (e.g., F-CPICHs) are assigned to the combined cell by a RNC. The RNC assigns the set of F-CPICHs during the RRC connection set up message. The RRC message may comprise the number of probing pilots assigned (N), channelization codes of these probing pilots, and the power offsets and/or exact powers of these pilots. In addition, the RRC message may comprise the indexes of the pilots. For example pilot 1, pilot 2, etc. The central scheduler, i.e. the radio network scheduler element, may use this pool of probing pilots for probing the UE.

Step 2:

Once the UE receives, or otherwise gets, information about the probing pilots, the UE tries to estimate the channel from each probing pilot and computes, or calculates, the channel quality (CQI). Each CQI may be time multiplexed and fed back to the central node, i.e. the radio network scheduler element.

Step 3:

The central node (central scheduler) analyses each CQI and chooses, or otherwise selects, the best M mode, where M<N.

Step 4:

The central node (central scheduler) informs the UE about this best M probing pilots. This can be done in different ways. In a first example embodiment, the central node conveys this information to the RNC via Iub signaling. The RNC reconfigures the UE by sending a RRC message where it informs the UE about the number of the best M probing pilots, channelization codes of these probing pilots, and the power offsets and/or exact powers of these pilots (for example, the RNC indicates the index(es) of the best M probing pilots). The central scheduler uses these updated pilots for probing the UE and the process may be repeated according to FIG. 3. In a second example embodiment, the central scheduler may inform the UE about the best M probing pilots using a HS-SCCH order for a specific UE in question. Hence, the UE may report the CQI for these best M probing pilots.

Method II: Using Path Loss

Step 1:

In Method II, the central node identifies the best M nodes from the downlink measurements. For example by observing the path loss, it is made possible to identify which nodes that can influence the UE.

Step 2:

The central node (central scheduler) informs the UE about the best M probing pilots. This can be done in different ways. In a first example embodiment, the central node conveys this information to the RNC via Iub signaling. The RNC reconfigures the UE by sending a RRC message where it informs the UE about the best M probing pilots, channelization codes of these probing pilots, and the power offsets and/or exact powers of these pilots. The central scheduler uses these updated pilots for probing the UE and the process may be repeated according to FIG. 3. In a second example embodiment, the central scheduler may inform the UE about the best M probing pilots by using a HS-SCCH order for a specific UE. Hence the UE may report the CQI for these best M probing pilots.

In other words, the inventors propose methods for conveying information about probing pilots (e.g., F-CPICHs) to a UE such that a fast node selection is possible in combined radio cell deployments.

Figure 5A:
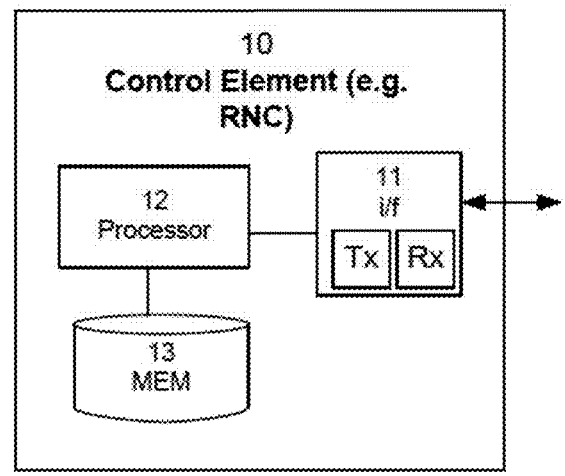
FIGS. 5A-5C are example implementations of different network elements.
Figure 5B:
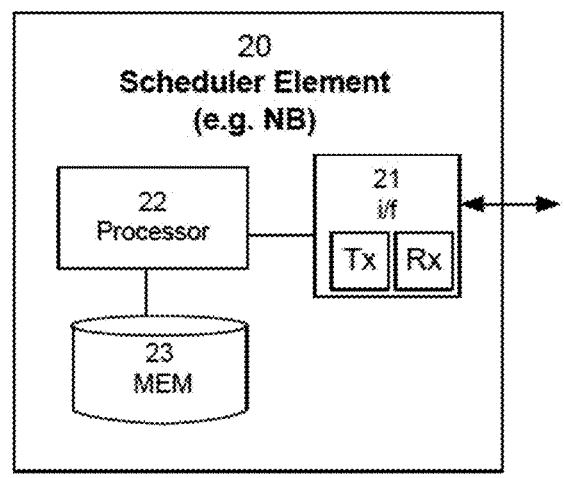
Figure 5C:
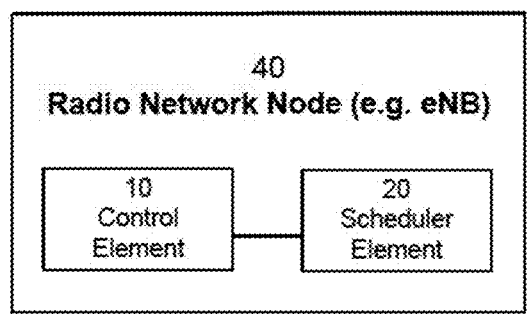

Turning now to FIGS. 5A-5C, various example embodiments of the earlier-discussed radio network control element 10 and the earlier-discussed radio network scheduler element 20, respectively, will be further detailed.

FIG. 5A illustrates a radio network control element 10, such as a RNC. The radio network control element 10 may be part of a radio communication network of a combined radio cell environment (see e.g. FIG. 2). The radio network control element 10 is configured to control a radio network scheduler element 20. The radio network scheduler element 20 is configured to serve a radio cell sector of a combined radio cell.

In one embodiment, the radio network control element 10 comprises means 12, 13 adapted to assign a set of probing pilots to the combined radio cell. In one example implementation, the means 12, 13 adapted to assign the set of probing pilots to the combined radio cell are implemented by means of a processor 12 and a memory 13. The memory 13 may store computer program code which, when run in the processor 12, causes the radio network control element 10 to assign a set of probing pilots to the combined radio cell.

Furthermore, the radio network control element 10 comprises means 11 adapted to transmit a first signal to a UE via the radio network scheduler element. The first signal comprises information about the assigned set of probing pilots. In one example implementation, the means 11 adapted to transmit the first signal to the UE via the radio network scheduler element is implemented by means of a transmitter (Tx) 11.

Still further, the radio network control element 10 comprises means 11 adapted to receive a third signal from the radio network scheduler element. The third signal comprises information about probing pilots of a subset of probing pilots. In one example implementation, the means 11 adapted to receive the third signal from the radio network scheduler element is implemented by means of a receiver (Rx) 11.

Moreover, the radio network control element 10 comprises means 11 adapted to transmit a fourth signal to said user equipment via the radio network scheduler element. The fourth signal comprises information about the probing pilots of the subset of probing pilots such that the UE can be subsequently reconfigured for probing by the radio network scheduler element utilizing only the probing pilots of the subset of probing pilots. In one example implementation, the means 11 adapted to transmit the fourth signal to said user equipment via the radio network scheduler element is implemented by means of the transmitter (Tx) 11.

In some embodiments, the means 11 adapted to transmit the first signal is adapted to transmit said first signal comprising information about the assigned set of probing pilots only once.

FIG. 5B illustrates a radio network scheduler element 20, such as a NodeB (NB). The radio network scheduler element 20 may be part in a radio communication network of a combined radio cell environment. The radio communication network comprises a radio network control element 10 which is configured to control the radio network scheduler element 20, wherein the radio network scheduler element 20 is configured to serve a radio cell sector of a combined radio cell.

The radio network scheduler element 20 comprises means 21 adapted to receive a second signal from a UE. The second signal comprises channel quality feedback information related to each one of the probing pilots in an assigned set of probing pilots. In one example implementation, the means 21 adapted to receive the second signal from the UE is implemented by means of a receiver (Rx) 21.

The radio network scheduler element 20 also comprises means 22, 23 adapted to rank, based on the received channel quality feedback information, the probing pilots of said set of probing pilots. In one example implementation, the means 22, 23 adapted to rank the probing pilots of said set of probing pilots are implemented by means of a processor 22 and a memory 23. The memory 23 may store computer program code which, when run in the processor 22, causes the radio network scheduler element 20 to rank, based on the received channel quality feedback information, the probing pilots of said set of probing pilots.

The radio network scheduler element 20 also comprises means 22, 23 adapted to select, based on the ranking of the probing pilots of said set of probing pilots, a subset of probing pilots from the assigned set of probing pilots. In one example implementation, the means 22, 23 adapted to select a subset of probing pilots from the assigned set of probing pilots are implemented by means of the processor 22 and the memory 23. The memory 23 may store computer program code which, when run in the processor 22, causes the radio network scheduler element 20 to select, based on the ranking of the probing pilots of said set of probing pilots, a subset of probing pilots from the assigned set of probing pilots.

Furthermore, the radio network scheduler element 20 comprises means 21 adapted to transmit a third signal to the radio network control element. The third signal comprises information about the probing pilots of the subset of probing pilots. In one example implementation, the means 21 adapted to transmit the third signal to the radio network control element is implemented by means of the transmitter (Tx) 21.

Still further, the radio network scheduler element 20 comprises means 21 adapted to transmit, to said UE, only the probing pilots of the subset of probing pilots for subsequent probing. In one example implementation, the means 21 adapted to transmit, to said UE, only the probing pilots of the subset of probing pilots for subsequent probing is implemented by means of the transmitter (Tx) 21.

The above-mentioned channel quality feedback information related to each one of the probing pilots in the assigned set of probing pilots may comprise Channel Quality Indicators (CQIs) related to each one the probing pilots in the assigned set of probing pilots. Additionally, or alternatively, the channel quality feedback information related to each one of the probing pilots in the assigned set of probing pilots may comprise information from downlink measurements related to each one the probing pilots in the assigned set of probing pilots. The downlink measurements may include path losses.

FIG. 5C illustrates a radio network node 40, such as an eNodeB (eNB). The radio network node 40 may be part in a radio communication network of a combined radio cell environment, wherein the radio network node 40 is configured to serve a radio cell sector of a combined radio cell. The radio network node 40 may implement the functionality of both the radio network control element 10 and the radio network scheduler element 20. Therefore, the details with respect to the radio network node 40 will not be repeated here.

A non-exhaustive list of advantages of one or more aspects of the methods, systems and devices described in this disclosure include:
1. Provide spatial reuse gain. In turn, the overall capacity and performance can be improved.
2. UE battery saving.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

SELECTED EXAMPLE EMBODIMENTS

The technology disclosed herein thus encompasses without limitation the following non-limiting example embodiments:

Example Embodiment M1

A method performed in a radio communication network of a combined radio cell environment, wherein the radio communication network comprises a radio network control element controlling a radio network scheduler element, which radio network scheduler element is serving a radio cell sector of a combined radio cell; the method comprising:
  the radio network control element assigning (101) a set of probing pilots to the combined radio cell;
  the radio network control element transmitting (102) a first signal to a user equipment via a radio network scheduler element, the first signal comprising information about the assigned set of probing pilots;
  the radio network scheduler element receiving (103) a second signal from said user equipment, the second signal comprising channel quality feedback information related to each one the probing pilots in the assigned set of probing pilots;
  the radio network scheduler element ranking (104), based on the received channel quality feedback information, the probing pilots of said set of probing pilots;
  the radio network scheduler element selecting (105), based on the ranking of the probing pilots of said set of probing pilots, a subset of probing pilots from the assigned set of probing pilots;
  the radio network scheduler element transmitting (106) a third signal to the radio network control element, the third signal comprising information about the probing pilots of the subset of probing pilots;
  the radio network control element receiving (106) the third signal from the radio network scheduler element;
  the radio network control element transmitting (107) a fourth signal to said user equipment via the radio network scheduler element, the fourth signal comprising information about the probing pilots of the subset of probing pilots such that the user equipment can be subsequently reconfigured for probing by the radio network scheduler element utilizing only the probing pilots of the subset of probing pilots; and
  the radio network scheduler element transmitting (108), to said user equipment, only the probing pilots of the subset of probing pilots for subsequent probing.

Example Embodiment M2

The method according to example embodiment M1, wherein the radio network control element transmits (102) said first signal comprising information about the assigned set of probing pilots only once.

Example Embodiment M3

The method according to example embodiment M1 or M2, wherein the channel quality feedback information related to each one of the probing pilots in the assigned set of probing pilots comprises Channel Quality Indicators (CQIs) related to each one the probing pilots in the assigned set of probing pilots.

Example Embodiment M4

The method according to example embodiment M1 or M2, wherein the channel quality feedback information related to each one of the probing pilots in the assigned set of probing pilots comprises information from downlink measurements related to each one the probing pilots in the assigned set of probing pilots.

Example Embodiment M5

The method according to example embodiment M4, wherein the downlink measurements include path losses.

Example Embodiment M6

The method according to any one of the example embodiments M1-M5, wherein the radio network control element and the radio network scheduler element are separate elements.

Example Embodiment M7

The method according to example embodiment M6, wherein the radio network control element is a Radio Network Controller (RNC) and the radio network scheduler element is a NodeB.

Example Embodiment M8

The method according to any one of the example embodiments M1-M5, wherein the radio network control element and the radio network scheduler element are comprised in a single element.

Example Embodiment M9

The method according to example embodiment M8, wherein the single element is an evolved NodeB (eNodeB).

Example Embodiment M10

A method performed by a radio network control element in a radio communication network of a combined radio cell environment, wherein the radio communication network comprises the radio network control element controlling a radio network scheduler element, and wherein the radio network scheduler element is serving a radio cell sector of a combined radio cell; the method comprising:
- assigning (101) a set of probing pilots to the combined radio cell;
- transmitting (102) a first signal to a user equipment via a radio network scheduler element, the first signal comprising information about the assigned set of probing pilots;
- receiving (106) a third signal from the radio network scheduler element, the third signal comprising information about probing pilots of a subset of probing pilots; and
- transmitting (107) a fourth signal to said user equipment via the radio network scheduler element, the fourth signal comprising information about the probing pilots of the subset of probing pilots such that the user equipment can be subsequently reconfigured for probing by the radio network scheduler element utilizing only the probing pilots of the subset of probing pilots.

Example Embodiment M11

The method according to example embodiment M10, comprising: transmitting (102) said first signal comprising information about the assigned set of probing pilots only once.

Example Embodiment M12

The method according to M10 or M11, wherein the radio network control element is a Radio Network Controller (RNC).

Example Embodiment M13

A method performed by a radio network scheduler element in a radio communication network of a combined radio cell environment, wherein the radio communication network comprises a radio network control element controlling the radio network scheduler element, and wherein the radio network scheduler element is serving a radio cell sector of a combined radio cell; the method comprising:
- receiving (103) a second signal from a user equipment, the second signal comprising channel quality feedback information related to each one of the probing pilots in an assigned set of probing pilots;
- ranking (104), based on the received channel quality feedback information, the probing pilots of said set of probing pilots;
- selecting (105), based on the ranking of the probing pilots of said set of probing pilots, a subset of probing pilots from the assigned set of probing pilots;
- transmitting (106) a third signal to the radio network control element, the third signal comprising information about the probing pilots of the subset of probing pilots; and
- transmitting (108), to said user equipment, only the probing pilots of the subset of probing pilots for subsequent probing.

Example Embodiment M14

The method according to example embodiment M13, wherein the channel quality feedback information related to each one of the probing pilots in the assigned set of probing pilots comprises Channel Quality Indicators (CQIs) related to each one the probing pilots in the assigned set of probing pilots.

Example Embodiment M15

The method according to example embodiment M13, wherein the channel quality feedback information related to each one of the probing pilots in the assigned set of probing pilots comprises information from downlink measurements related to each one the probing pilots in the assigned set of probing pilots.

Example Embodiment M16

The method according to example embodiment M15, wherein the downlink measurements include path losses.

Example Embodiment M17

The method according to any one of the example embodiments M13-M16, wherein the radio network scheduler element is a NodeB.

Example Embodiment M18

A method performed by a radio network node in a radio communication network of a combined radio cell environment, wherein radio network node is serving a radio cell sector of a combined radio cell; the method comprising:
- assigning (101) a set of probing pilots to the combined radio cell;
- transmitting (102) a first signal to a user equipment, the first signal comprising information about the assigned set of probing pilots;
- receiving (103) a second signal from said user equipment, the second signal comprising channel quality feedback information related to each one the probing pilots in the assigned set of probing pilots;
- ranking (104), based on the received channel quality feedback information, the probing pilots of said set of probing pilots;
- selecting (105), based on the ranking of the probing pilots of said set of probing pilots, a subset of probing pilots from the assigned set of probing pilots;
- transmitting (107) a fourth signal to said user equipment, the fourth signal comprising information about the probing pilots of the subset of probing pilots such that the user equipment can be subsequently reconfigured for probing by the radio network scheduler element utilizing only the probing pilots of the subset of probing pilots; and
- transmitting (108), to said user equipment, only the probing pilots of the subset of probing pilots for subsequent probing.

Example Embodiment M19

The method according to example embodiment M18, comprising: transmitting (102) said first signal comprising information about the assigned set of probing pilots only once.

Example Embodiment M20

The method according to example embodiment M18 or M19, wherein the channel quality feedback information related to each one of the probing pilots in the assigned set of probing pilots comprises Channel Quality Indicators (CQIs) related to each one the probing pilots in the assigned set of probing pilots.

Example Embodiment M21

The method according to example embodiment M18 or M19, wherein the channel quality feedback information related to each one of the probing pilots in the assigned set of probing pilots comprises information from downlink measurements related to each one the probing pilots in the assigned set of probing pilots.

Example Embodiment M22

The method according to example embodiment M21, wherein the downlink measurements include path losses.

Example Embodiment M23

The method according to any one of the example embodiments M18-M22, wherein radio network node is an evolved NodeB (eNodeB).

Example Embodiment S1

A system in a radio communication network of a combined radio cell environment, wherein the system comprises a radio network control element (10) configured to control a radio network scheduler element (20), which radio network scheduler element (20) is configured to serve a radio cell sector of a combined radio cell; wherein:
- the radio network control element (10) is configured to assign a set of probing pilots to the combined radio cell;
- the radio network control element (10) is configured to transmit a first signal to a user equipment via a radio network scheduler element, the first signal comprising information about the assigned set of probing pilots;
- the radio network scheduler element (20) is configured to receive a second signal from said user equipment, the second signal comprising channel quality feedback information related to each one the probing pilots in the assigned set of probing pilots;
- the radio network scheduler element (10) is configured to rank, based on the received channel quality feedback information, the probing pilots of said set of probing pilots;
- the radio network scheduler element (20) is configured to select, based on the ranking of the probing pilots of said set of probing pilots, a subset of probing pilots from the assigned set of probing pilots;
- the radio network scheduler element (20) is configured to transmit a third signal to the radio network control element, the third signal comprising information about the probing pilots of the subset of probing pilots;
- the radio network control element (10) is configured to receive the third signal from the radio network scheduler element;
- the radio network control element (10) is configured to transmit a fourth signal to said user equipment via the radio network scheduler element, the fourth signal comprising information about the probing pilots of the subset of probing pilots such that the user equipment can be subsequently reconfigured for probing by the radio network scheduler element utilizing only the probing pilots of the subset of probing pilots; and
- the radio network scheduler element (20) is configured to transmit, to said user equipment, only the probing pilots of the subset of probing pilots for subsequent probing.

Example Embodiment S2

The system according to example embodiment S1, wherein the radio network control element (10) is configured to transmit said first signal comprising information about the assigned set of probing pilots only once.

Example Embodiment S3

The system according to example embodiment S1 or S2, wherein the channel quality feedback information related to each one of the probing pilots in the assigned set of probing pilots comprises Channel Quality Indicators (CQIs) related to each one the probing pilots in the assigned set of probing pilots.

Example Embodiment S4

The system according to example embodiment S1 or S2, wherein the channel quality feedback information related to each one of the probing pilots in the assigned set of probing pilots comprises information from downlink measurements related to each one the probing pilots in the assigned set of probing pilots.

Example Embodiment S5

The system according to example embodiment S4, wherein the downlink measurements include path losses.

Example Embodiment S6

The system according to any one of the example embodiments S1-S5, wherein the radio network control element (10) and the radio network scheduler element (20) are separate elements.

Example Embodiment S7

The system according to example embodiment S6, wherein the radio network control element is a Radio Network Controller (RNC) and the radio network scheduler element is a NodeB.

Example Embodiment S8

The system according to any one of the example embodiments S1-S5, wherein the radio network control element (10) and the radio network scheduler element (20) are comprised in a single element (40).

Example Embodiment S9

The system according to S8, wherein the single element (40) is an evolved NodeB (eNodeB).

Example Embodiment CE1

A radio network control element (10) in a radio communication network of a combined radio cell environment, wherein the radio network control element (10) is configured to control a radio network scheduler element (20), which radio network scheduler element (20) is configured to serve a radio cell sector of a combined radio cell, the radio network control element (10) comprising:
- means (12, 13) adapted to assign a set of probing pilots to the combined radio cell;
- means (11) adapted to transmit a first signal to a user equipment via a radio network scheduler element, the first signal comprising information about the assigned set of probing pilots;
- means (11) adapted to receive a third signal from the radio network scheduler element, the third signal comprising information about probing pilots of a subset of probing pilots; and
- means (11) adapted to transmit a fourth signal to said user equipment via the radio network scheduler element, the fourth signal comprising information about the probing pilots of the subset of probing pilots such that the user equipment can be subsequently reconfigured for probing by the radio network scheduler element utilizing only the probing pilots of the subset of probing pilots.

Example Embodiment CE2

The radio network control element (10) according to example embodiment CE1, wherein the means (11) adapted to transmit the first signal is adapted to transmit said first signal comprising information about the assigned set of probing pilots only once.

Example Embodiment CE3

The radio network control element (10) according to CE1 or CE2, wherein the radio network control element (10) is a Radio Network Controller (RNC).

Example Embodiment SE1

A radio network scheduler element (20) in a radio communication network of a combined radio cell environment, wherein the radio communication network comprises a radio network control element (10) which is configured to control the radio network scheduler element (20), and wherein the radio network scheduler element (20) is configured to serve a radio cell sector of a combined radio cell; the radio network scheduler element (20) comprising:
- means (21) adapted to receive a second signal from a user equipment, the second signal comprising channel quality feedback information related to each one of the probing pilots in an assigned set of probing pilots;
- means (22, 23) adapted to rank, based on the received channel quality feedback information, the probing pilots of said set of probing pilots;
- means (22, 23) adapted to select, based on the ranking of the probing pilots of said set of probing pilots, a subset of probing pilots from the assigned set of probing pilots;
- means (21) adapted to transmit a third signal to the radio network control element, the third signal comprising information about the probing pilots of the subset of probing pilots; and
- means (21) adapted to transmit, to said user equipment, only the probing pilots of the subset of probing pilots for subsequent probing.

Example Embodiment SE2

The radio network scheduler element (20) according to example embodiment SE1, wherein the channel quality feedback information related to each one of the probing pilots in the assigned set of probing pilots comprises Channel Quality Indicators (CQIs) related to each one the probing pilots in the assigned set of probing pilots.

Example Embodiment SE3

The radio network scheduler element (20) according to example embodiment SE1, wherein the channel quality feedback information related to each one of the probing pilots in the assigned set of probing pilots comprises information from downlink measurements related to each one the probing pilots in the assigned set of probing pilots.

Example Embodiment SE4

The radio network scheduler element (20) according to example embodiment SE3, wherein the downlink measurements include path losses.

Example Embodiment SE5

The radio network scheduler element (20) according to any one of the example embodiments SE1-SE4, wherein the radio network scheduler element (20) is a NodeB.

Example Embodiment N1

A radio network node (40) in a radio communication network of a combined radio cell environment, wherein the radio network node (40) is configured to serve a radio cell sector of a combined radio cell; the radio network node (40) comprising:
- means adapted to assign a set of probing pilots to the combined radio cell;
- means adapted to transmit a first signal to a user equipment, the first signal comprising information about the assigned set of probing pilots;
- means adapted to receive a second signal from said user equipment, the second signal comprising channel quality feedback information related to each one the probing pilots in the assigned set of probing pilots;
- means adapted to rank, based on the received channel quality feedback information, the probing pilots of said set of probing pilots;
- means adapted to select, based on the ranking of the probing pilots of said set of probing pilots, a subset of probing pilots from the assigned set of probing pilots;
- means adapted to transmit a fourth signal to said user equipment, the fourth signal comprising information about the probing pilots of the subset of probing pilots such that the user equipment can be subsequently reconfigured for probing by the radio network scheduler element utilizing only the probing pilots of the subset of probing pilots; and
- means adapted to transmit, to said user equipment, only the probing pilots of the subset of probing pilots for subsequent probing.

Example Embodiment N2

The radio network node (40) according to example embodiment N1, wherein the means adapted to transmit said first signal is adapted to transmit said first signal comprising information about the assigned set of probing pilots only once.

Example Embodiment N3

The radio network node (40) according to example embodiment N1 or N2, wherein the channel quality feedback information related to each one of the probing pilots in the assigned set of probing pilots comprises Channel Quality Indicators (CQIs) related to each one the probing pilots in the assigned set of probing pilots.

Example Embodiment N4

The radio network node (40) according to example embodiment N1 or N2, wherein the channel quality feedback information related to each one of the probing pilots in the assigned set of probing pilots comprises information from downlink measurements related to each one the probing pilots in the assigned set of probing pilots.

Example Embodiment N5

The radio network node (40) according to example embodiment N4, wherein the downlink measurements include path losses.

Example Embodiment N6

The radio network node (40) according to any one of the example embodiments N1-N5, wherein radio network node (40) is an evolved NodeB (eNodeB).

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure.

Furthermore, although specific terms may be employed herein, they are used in a generic and descriptive sense only and not for purposes of limitation. For example, while many of the embodiments described herein have been described using the term "probing pilot(s)", persons skilled in the art will appreciate that the term "channel state information-reference signal(s) (CSI-RS)" could be used as an alternative term. In fact, the term "probing pilot(s)" is sometimes used in HSPA, whereas the term CSI-RS is sometimes used in LTE. As another alternative, the term "Channel Quality Sounding Reference Signal" could be used to denote a probing pilot and/or a CSI-RS.

What is claimed is:

1. A method performed in a radio communication network of a combined radio cell environment, wherein the radio communication network comprises a radio network control element controlling a radio network scheduler element, which radio network scheduler element is serving a radio cell sector of a combined radio cell, the method comprising:
   assigning, by the radio network control element, a set of probing pilots to the combined radio cell;
   transmitting, by the radio network control element, a first signal to a user equipment via the radio network scheduler element, the first signal comprising information about the assigned set of probing pilots;
   receiving, by the radio network scheduler element, a second signal from said user equipment, the second signal comprising channel quality feedback information related to each one of the probing pilots in the assigned set of probing pilots;
   ranking, by the radio network scheduler element, based on the received channel quality feedback information, the probing pilots of said assigned set of probing pilots;
   selecting, by the radio network scheduler element, based on the ranking of the probing pilots of said assigned set of probing pilots, a subset of probing pilots comprising two or more probing pilots from the assigned set of probing pilots;
   transmitting, by the radio network scheduler element, a third signal to the radio network control element, the third signal comprising information about the subset of probing pilots;
   receiving, by the radio network control element, the third signal from the radio network scheduler element;
   transmitting, by the radio network control element, a fourth signal to said user equipment via the radio network scheduler element, the fourth signal comprising information about the subset of probing pilots such that the user equipment can be subsequently reconfigured for probing by the radio network scheduler element utilizing only the subset of probing pilots; and
   transmitting, by the radio network scheduler element, to said user equipment, only the subset of probing pilots for subsequent probing.

2. The method according to claim 1, wherein the radio network control element transmits said first signal comprising information about the assigned set of probing pilots only once.

3. The method according to claim 1, wherein the channel quality feedback information related to each one of the probing pilots in the assigned set of probing pilots comprises Channel Quality Indicators (CQIs) related to each one the probing pilots in the assigned set of probing pilots.

4. The method according to claim 1, wherein the channel quality feedback information related to each one of the probing pilots in the assigned set of probing pilots comprises information from downlink measurements related to each one the probing pilots in the assigned set of probing pilots.

5. The method according to claim 4, wherein the downlink measurements include path losses.

6. The method according to claim 1, wherein the radio network control element and the radio network scheduler element are separate elements.

7. The method according to claim 6, wherein the radio network control element is a Radio Network Controller (RNC), and wherein the radio network scheduler element is a NodeB.

8. The method according to claim 1, wherein the radio network control element and the radio network scheduler element are comprised in a single element.

9. The method according to claim 8, wherein the single element is an evolved NodeB, eNodeB.

10. A method performed by a radio network control element in a radio communication network of a combined radio cell environment, wherein the radio communication network comprises the radio network control element controlling a radio network scheduler element, and wherein the radio network scheduler element is serving a radio cell sector of a combined radio cell, the method comprising:
   assigning a set of probing pilots to the combined radio cell;
   transmitting a first signal to a user equipment via the radio network scheduler element, the first signal comprising information about the assigned set of probing pilots;
   receiving a third signal from the radio network scheduler element, the third signal comprising information about a subset of probing pilots comprising two or more probing pilots from the assigned set of probing pilots; and transmitting a fourth signal to said user equipment via the radio network scheduler element, the fourth signal comprising information about the subset of probing pilots such that the user equipment can be subsequently reconfigured for probing by the radio network scheduler element utilizing only the subset of probing pilots.

11. The method according to claim 10, comprising: transmitting said first signal comprising information about the assigned set of probing pilots only once.

12. The method according to claim 10, wherein the radio network control element is a Radio Network Controller (RNC).

13. A method performed by a radio network scheduler element in a radio communication network of a combined radio cell environment, wherein the radio communication network comprises a radio network control element controlling the radio network scheduler element, and wherein the radio network scheduler element is serving a radio cell sector of a combined radio cell; the method comprising:

receiving a second signal from a user equipment, the second signal comprising channel quality feedback information related to each one of the probing pilots in an assigned set of probing pilots;

ranking, based on the received channel quality feedback information, the probing pilots of said assigned set of probing pilots;

selecting, based on the ranking of the probing pilots of said assigned set of probing pilots, a subset of probing pilots comprising two or more probing pilots from the assigned set of probing pilots;

transmitting a third signal to the radio network control element, the third signal comprising information about the subset of probing pilots; and transmitting, to said user equipment, only the subset of probing pilots for subsequent probing.

14. The method according to claim 13, wherein the channel quality feedback information related to each one of the probing pilots in the assigned set of probing pilots comprises Channel Quality Indicators (CQIs) related to each one the probing pilots in the assigned set of probing pilots.

15. The method according to claim 13, wherein the channel quality feedback information related to each one of the probing pilots in the assigned set of probing pilots comprises information from downlink measurements related to each one the probing pilots in the assigned set of probing pilots.

16. The method according to claim 15, wherein the downlink measurements include path losses.

17. The method according to claim 13, wherein the radio network scheduler element is a NodeB.

18. A method performed by a radio network node in a radio communication network of a combined radio cell environment, wherein radio network node is serving a radio cell sector of a combined radio cell; the method comprising:

assigning a set of probing pilots to the combined radio cell;

transmitting a first signal to a user equipment, the first signal comprising information about the assigned set of probing pilots;

receiving a second signal from said user equipment, the second signal comprising channel quality feedback information related to each one the probing pilots in the assigned set of probing pilots;

ranking, based on the received channel quality feedback information, the probing pilots of said assigned set of probing pilots;

selecting, based on the ranking of the probing pilots of said set of probing pilots, a subset of probing pilots comprising two or more probing pilots from the assigned set of probing pilots;

transmitting a fourth signal to said user equipment, the fourth signal comprising information about the subset of probing pilots such that the user equipment can be subsequently reconfigured for probing by the radio network scheduler element utilizing only the subset of probing pilots; and transmitting, to said user equipment, only the subset of probing pilots for subsequent probing.

19. The method according to claim 18, comprising: transmitting said first signal comprising information about the assigned set of probing pilots only once.

20. The method according to claim 18, wherein the channel quality feedback information related to each one of the probing pilots in the assigned set of probing pilots comprises Channel Quality Indicators (CQIs), related to each one the probing pilots in the assigned set of probing pilots.

21. The method according to claim 18, wherein the channel quality feedback information related to each one of the probing pilots in the assigned set of probing pilots comprises information from downlink measurements related to each one the probing pilots in the assigned set of probing pilots.

22. The method according to claim 21, wherein the downlink measurements include path losses.

23. The method according to claim 18, wherein radio network node is an evolved NodeB, eNodeB.

24. A system in a radio communication network of a combined radio cell environment, wherein the system comprises a radio network control element configured to control a radio network scheduler element, which radio network scheduler element is configured to serve a radio cell sector of a combined radio cell; wherein:

the radio network control element is configured to assign a set of probing pilots to the combined radio cell;

the radio network control element is configured to transmit a first signal to a user equipment via the radio network scheduler element, the first signal comprising information about the assigned set of probing pilots;

the radio network scheduler element is configured to receive a second signal from said user equipment, the second signal comprising channel quality feedback information related to each one of the probing pilots in the assigned set of probing pilots;

the radio network scheduler element is configured to rank, based on the received channel quality feedback information, the probing pilots of said assigned set of probing pilots;

the radio network scheduler element is configured to select, based on the ranking of the probing pilots of said assigned set of probing pilots, a subset of probing pilots comprising two or more probing pilots from the assigned set of probing pilots;

the radio network scheduler element is configured to transmit a third signal to the radio network control element, the third signal comprising information about the subset of probing pilots;

the radio network control element is configured to receive the third signal from the radio network scheduler element;

the radio network control element is configured to transmit a fourth signal to said user equipment via the radio network scheduler element, the fourth signal comprising information about the subset of probing pilots such that the user equipment can be subsequently reconfigured for probing by the radio network scheduler element utilizing only the probing pilots of the subset of probing pilots; and the radio network scheduler element is configured to transmit, to said user equipment, only the subset of probing pilots for subsequent probing.

25. A radio network control element in a radio communication network of a combined radio cell environment, wherein the radio network control element is configured to control a radio network scheduler element, which radio network scheduler element is configured to serve a radio cell sector of a combined radio cell, the radio network control element comprising:
  a receiver;
  a transmitter;
  a processor; and
  a memory, wherein the memory comprises instructions executable by said processor whereby said radio network control element is operative to:
    assign a set of probing pilots to the combined radio cell;
    transmit a first signal to a user equipment via the radio network scheduler element, the first signal comprising information about the assigned set of probing pilots;
    receive a third signal from the radio network scheduler element, the third signal comprising information about a subset of probing pilots comprising two or more probing pilots from the assigned set of probing pilots; and
    transmit a fourth signal to said user equipment via the radio network scheduler element, the fourth signal comprising information about the subset of probing pilots such that the user equipment can be subsequently reconfigured for probing by the radio network scheduler element utilizing only the probing pilots of the subset of probing pilots.

26. A radio network scheduler element in a radio communication network of a combined radio cell environment, wherein the radio communication network comprises a radio network control element which is configured to control the radio network scheduler element, and wherein the radio network scheduler element is configured to serve a radio cell sector of a combined radio cell; the radio network scheduler element comprising:
  a receiver;
  a transmitter;
  a processor; and
  a memory, wherein the memory comprises instructions executable by said processor whereby said radio network control element is operative to:
    receive a second signal from a user equipment, the second signal comprising channel quality feedback information related to each one of the probing pilots in an assigned set of probing pilots;
    rank, based on the received channel quality feedback information, the probing pilots of said assigned set of probing pilots;
    select, based on the ranking of the probing pilots of said assigned set of probing pilots, a subset of probing pilots comprising two or more probing pilots from the assigned set of probing pilots;
    transmit a third signal to the radio network control element, the third signal comprising information about the subset of probing pilots; and
    transmit, to said user equipment, only the subset of probing pilots for subsequent probing.

27. A radio network node in a radio communication network of a combined radio cell environment, wherein the radio network node is configured to serve a radio cell sector of a combined radio cell; the radio network node comprising:
  a receiver;
  a transmitter;
  a processor; and
  a memory, wherein the memory comprises instructions executable by said processor whereby said radio network control element is operative to:
    assign a set of probing pilots to the combined radio cell;
    transmit a first signal to a user equipment, the first signal comprising information about the assigned set of probing pilots;
    receive a second signal from said user equipment, the second signal comprising channel quality feedback information related to each one the probing pilots in the assigned set of probing pilots;
    rank, based on the received channel quality feedback information, the probing pilots of said assigned set of probing pilots;
    select, based on the ranking of the probing pilots of said set of probing pilots, a subset of probing pilots comprising two or more probing pilots from the assigned set of probing pilots;
    transmit a fourth signal to said user equipment, the fourth signal comprising information about the subset of probing pilots such that the user equipment can be subsequently reconfigured for probing by a radio network scheduler element utilizing only the subset of probing pilots; and
    transmit, to said user equipment, only the subset of probing pilots for subsequent probing.

* * * * *